(12) United States Patent
Collura

(10) Patent No.: US 9,278,498 B2
(45) Date of Patent: Mar. 8, 2016

(54) BRAKE CALIPER COVER

(76) Inventor: Samuel F. Collura, Schaumburg, IL (US)

(*) Notice: Subject to any disclaimer, the term of this patent is extended or adjusted under 35 U.S.C. 154(b) by 71 days.

(21) Appl. No.: 13/272,829

(22) Filed: Oct. 13, 2011

(65) Prior Publication Data

US 2013/0095278 A1    Apr. 18, 2013

(51) Int. Cl.
   *B32B 3/06*       (2006.01)
   *F16D 55/225*     (2006.01)
   *F16D 55/00*      (2006.01)

(52) U.S. Cl.
   CPC .............. *B32B 3/06* (2013.01); *F16D 55/225* (2013.01); *F16D 2055/002* (2013.01); *F16D 2055/0037* (2013.01); *Y10T 29/49826* (2015.01); *Y10T 428/24008* (2015.01)

(58) Field of Classification Search
   CPC ... B32B 3/06; F16D 55/225; F16D 2055/002; F16D 2055/0037; Y10T 428/24008; Y10T 29/49826
   USPC ................ 188/218 A, 73.46, 73.47; D12/180
   See application file for complete search history.

(56) References Cited

U.S. PATENT DOCUMENTS

| | | | |
|---|---|---|---|
| 2,746,577 A * | 5/1956 | Butler | 188/264 A |
| 4,433,020 A * | 2/1984 | Narukawa et al. | 428/113 |
| D476,275 S * | 6/2003 | Winkler et al. | D12/180 |
| D507,772 S * | 7/2005 | Kozlowski | D12/180 |
| D515,484 S * | 2/2006 | Winkler et al. | D12/180 |
| 7,144,142 B1 | 12/2006 | Suarez | |
| 2004/0074716 A1* | 4/2004 | Brumfield et al. | 188/218 A |
| 2005/0258008 A1* | 11/2005 | King | 188/264 R |
| 2008/0194716 A1* | 8/2008 | Sasagawa et al. | 521/139 |
| 2009/0141514 A1* | 6/2009 | Palkovic | 362/509 |
| 2009/0321198 A1* | 12/2009 | Barland | 188/264 A |
| 2010/0065387 A1* | 3/2010 | Tsiberidis | 188/218 A |
| 2010/0083551 A1* | 4/2010 | Jamison | 42/75.01 |

FOREIGN PATENT DOCUMENTS

JP    60067245 A  *  4/1985  ............ B60T 1/06

OTHER PUBLICATIONS

Sound&Security. 'Found a great deal on MGP Caliper Covers!'. In LX Forums [online]. Mar. 17, 2011; 12:25PM [Retrieved on Feb. 9, 2013]. Retrieved from the internet <URL: http://www.lxforums.com/board/f74/found-great-deal-mgp-caliper-covers-259391/> Forum thread post #8.*

* cited by examiner

*Primary Examiner* — Robert A Siconolfi
*Assistant Examiner* — Charles Poon
(74) *Attorney, Agent, or Firm* — Erickson Law Group, PC

(57) ABSTRACT

A brake caliper cover system for existing brake caliper assembly in a vehicle. The brake caliper cover system has a front cover and a back cover. The front cover and back cover are disposed on the front and back sides of a brake caliper assembly, respectively. The front cover and back cover are fastened together about the brake caliper assembly.

19 Claims, 7 Drawing Sheets

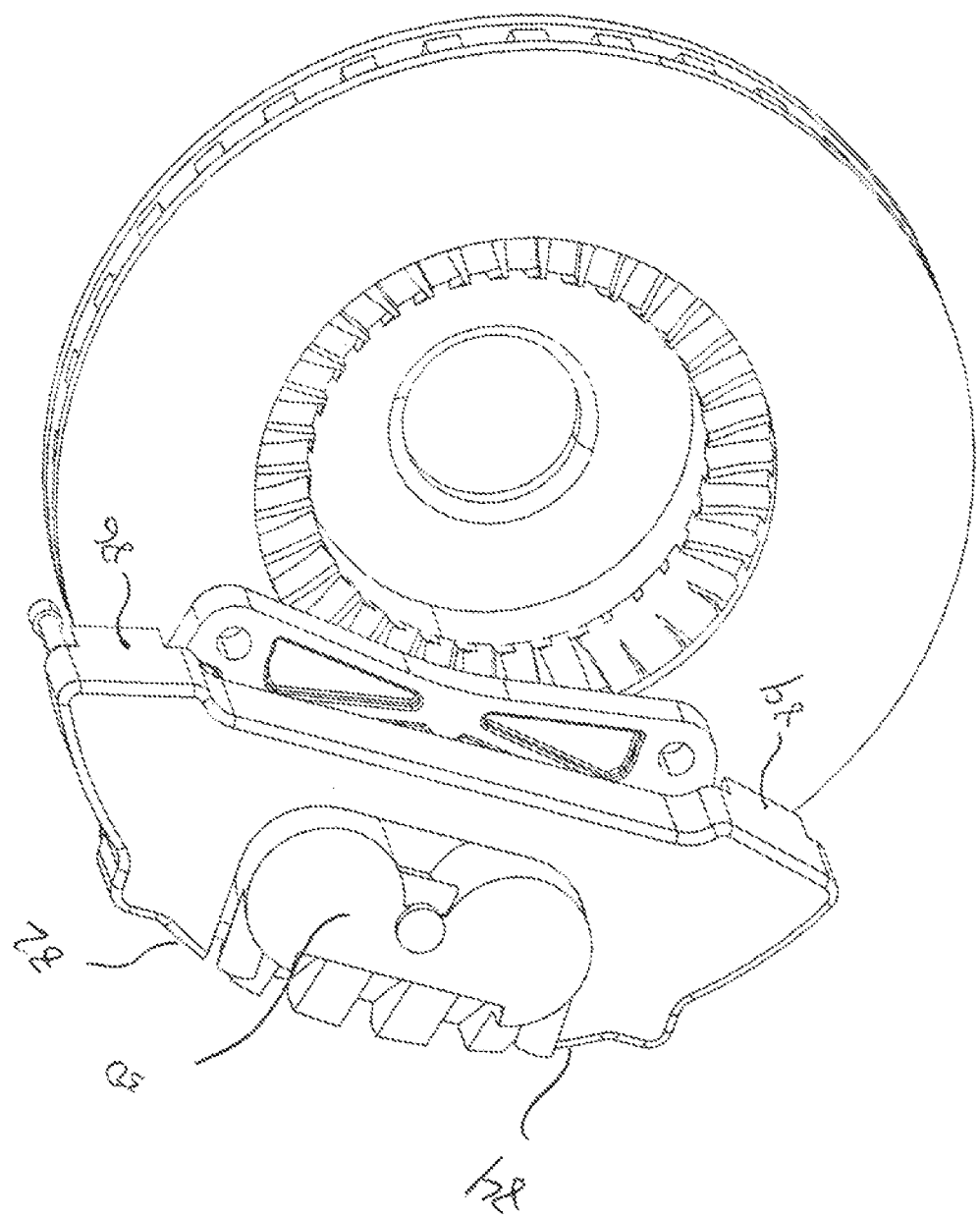

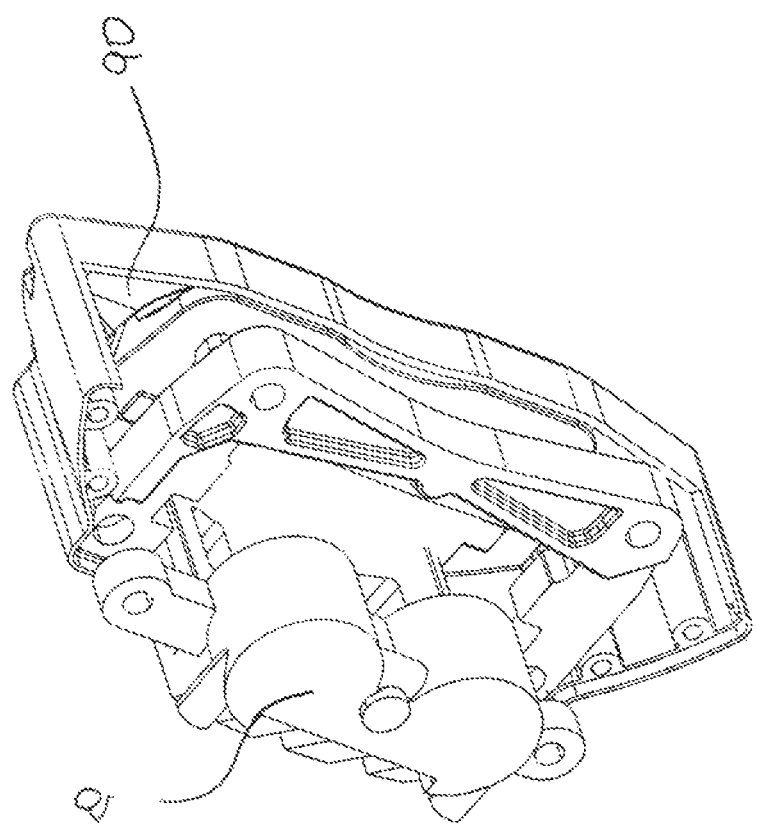

BRAKE CALIPER COVER

FIELD OF THE INVENTION

This invention relates to the field of automotive accessories, in particular to brake covers.

BACKGROUND OF THE INVENTION

Typical automotive braking systems use brake calipers to engage the rotor when braking is desired. Most automotive braking systems consist of floating or sliding single or double piston type calipers. In some high performance vehicles, the vehicles have high performance braking systems utilizing four piston aluminum fixed brake calipers. Various aftermarket kits are available to allow automotive enthusiasts to install high performance braking systems in their vehicles.

However, many automotive enthusiasts do not need the high performance braking system provided by the aftermarket high performance braking kits, but are only interested in the aesthetics provided by the installation of four piston calipers, particularly when used with aftermarket high performance aluminum wheels. Therefore it would be advantageous to provide a brake caliper cover for typical automotive braking systems which allows the braking systems to exude the aesthetic appeal of a high performance brake caliper, without the need to install the costly high performance braking systems.

Brake calipers covers are currently available to enhance various visual aspects and useful aspects of an automotive braking system. U.S. Pat. No. 7,144,142 discloses an illuminated cover for a brake caliper. Brake calipers covers, such as ones disclosed in U.S. Patent Application Publication 2004/0074716, are used to reduce the build up of brake dust. U.S. Patent Application Publication 2009/0321198 discloses brake caliper covers with vent openings to provide beneficial dynamics such as cooling the brake caliper mechanisms.

The present inventor has recognized the need for a brake caliper cover with increased stability.

The present inventor has recognized the need for a brake caliper cover with minimal movement once installed.

The present inventor has recognized the need for a brake caliper cover which is easy to install and remove.

The present inventor has recognized the need for a brake caliper cover which does not require modification to the existing brake assembly for installation.

SUMMARY OF THE INVENTION

A brake caliper cover system for at least partially enclosing an existing brake caliper assembly in a vehicle is disclosed. The brake caliper cover system has a front cover and a back cover. The front cover and back cover are disposed on the front and back sides of a brake caliper assembly. The front cover and back cover are fastened together and secured to the brake caliper assembly.

In some embodiments the front cover has a cushioning layer on the inner surface to minimize vibration and movement of the front cover over the front side of the brake caliper assembly. The back cover may also include a layer of foam on an inner surface for the same purpose.

In some embodiments each cover has an inner surface facing the brake disc configured to enclose the contours of the brake caliper assembly such that each cover can be disposed securely over the brake caliper assembly. The covers are attached to a fixed portion of the caliper. The covers when attached to the fixed portion allow a moving part of the caliper, such as the hydraulic piston(s), to move along shafts within a spaced defined by the cover.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 6 is a perspective view of the back side of the brake caliper assembly with the back caliper cover.

FIG. 7 is a perspective view of the brake caliper assembly with the back caliper cover and the brake disc removed for clarity.

DETAILED DESCRIPTION OF THE PREFERRED EMBODIMENTS

Figure 1:
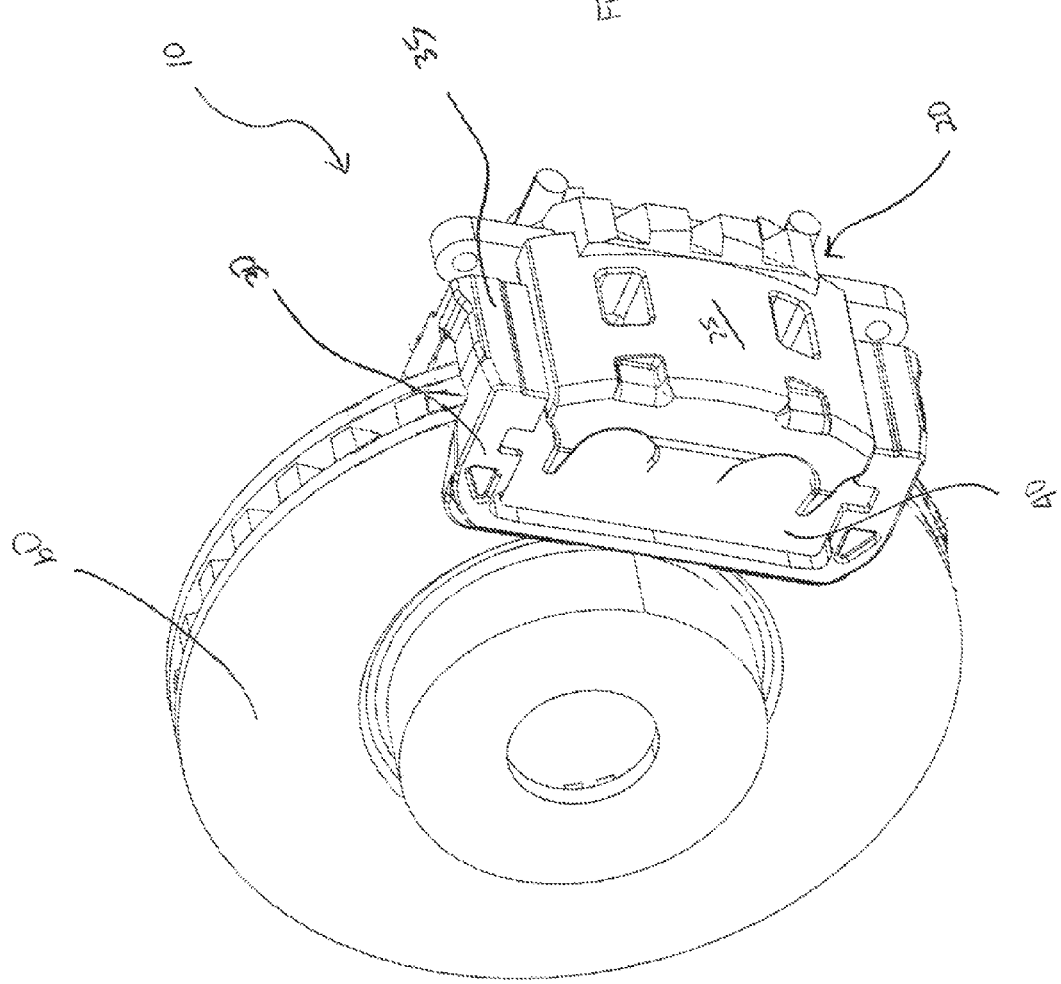
FIG. 1 is a perspective view of a brake caliper assembly and the brake disc.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a front perspective view of a conventional brake caliper assembly 10 in an automobile. The brake caliper assembly 10 includes a caliper housing 20 disposed over a bracket member 30, for receiving brake pads 40. Piston housing 50 (FIG. 7) receives hydraulic fluid for actuating hydraulic cylinders (not shown) which compress the pair of brake pads 40 against the brake disc 60 when braking is desired. In some embodiments, the brake caliper assembly may be that shown in U.S. Pat. No. 4,775,034, which is incorporated by reference to the extent not inconsistent with the present description. It will further be recognized that in some embodiments, the brake caliper assembly may be any such brake assembly known in the art.

Figure 2:
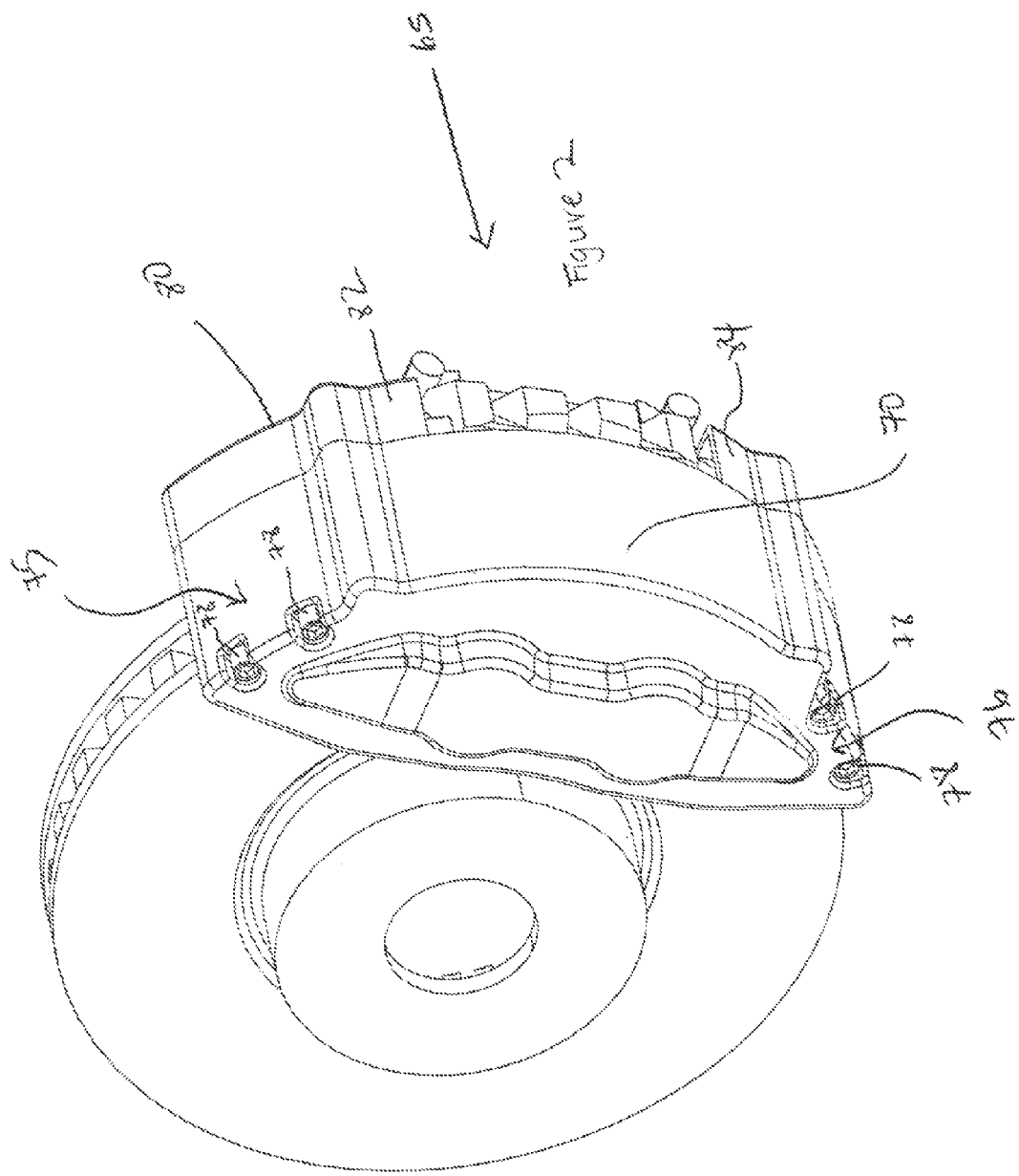
FIG. 2 is a perspective view of the brake caliper assembly of FIG. 1 with one exemplary embodiment of the brake caliper cover system.

As illustrated in FIG. 2, illustrates a front caliper cover 70 of the brake caliper cover system 65 is disposed over the front side of the brake caliper assembly 10. The front caliper cover 70 encloses the front side of the caliper housing and the front brake bracket, and extends to enclose, the spine region 25 (FIG. 1) of the caliper housing 20 and the spine region 35 of the brake bracket. The caliper cover system has an upper region 75 above, and a lower region 76 below, the spine regions 25, 35. The upper and lower regions 75, 76 of the caliper cover system has shafts or bosses 77 (FIG. 3) for receiving bolts 78. The bosses 77 can be molded into the cover 70. The bosses provides a holding feature for the bolts. As illustrated in FIG. 2, two bolts are disposed at the upper region 75, and two bolts are disposed at the lower region 76 to fasten the front and back caliper covers together. The top of the shafts 77 are recessed to receive the top of the bolt such that the top of the bolts do not protrude from the cover.

Figure 3:
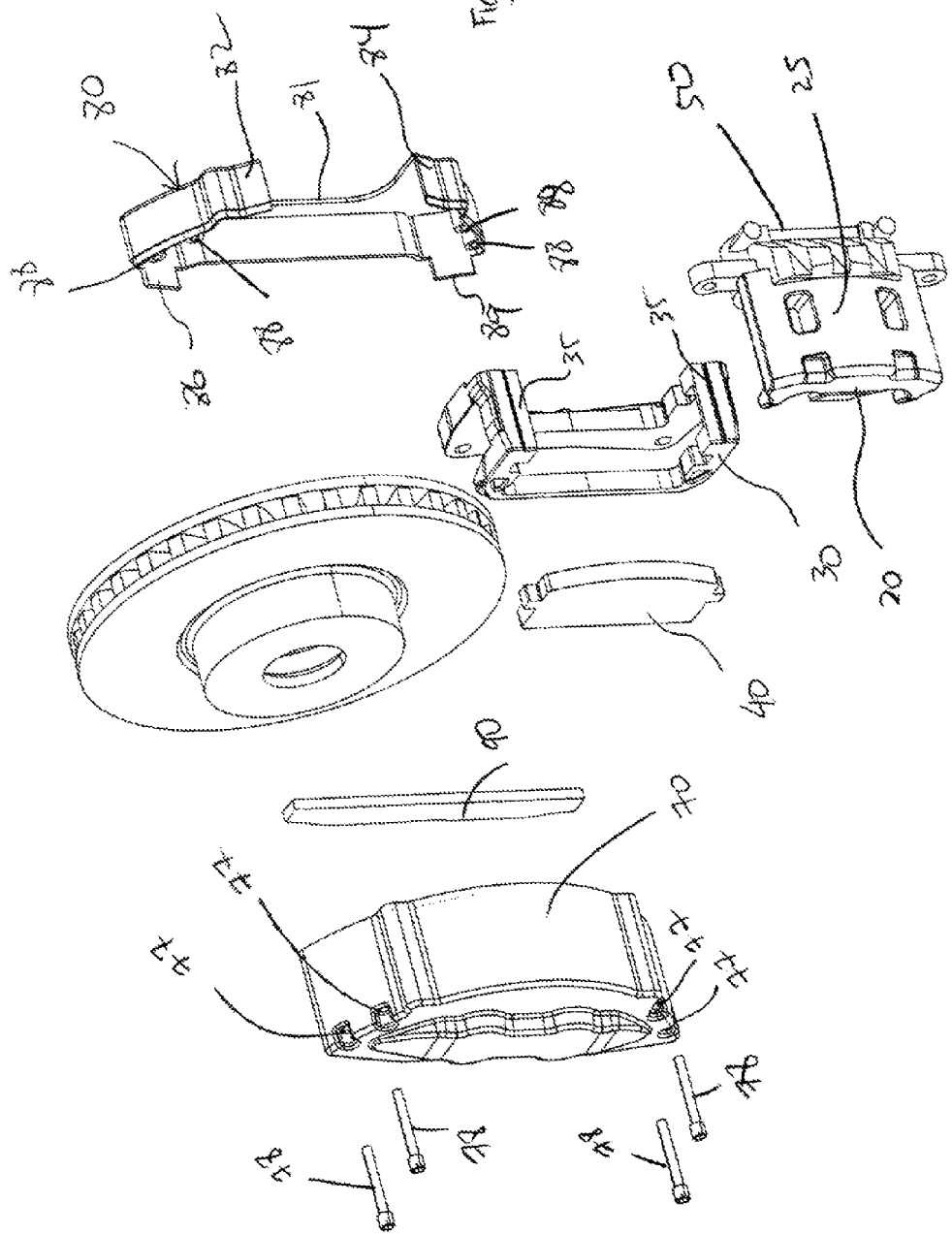
FIG. 3 is an exploded view of the brake caliper cover system and the brake caliper assembly.
Figure 4:
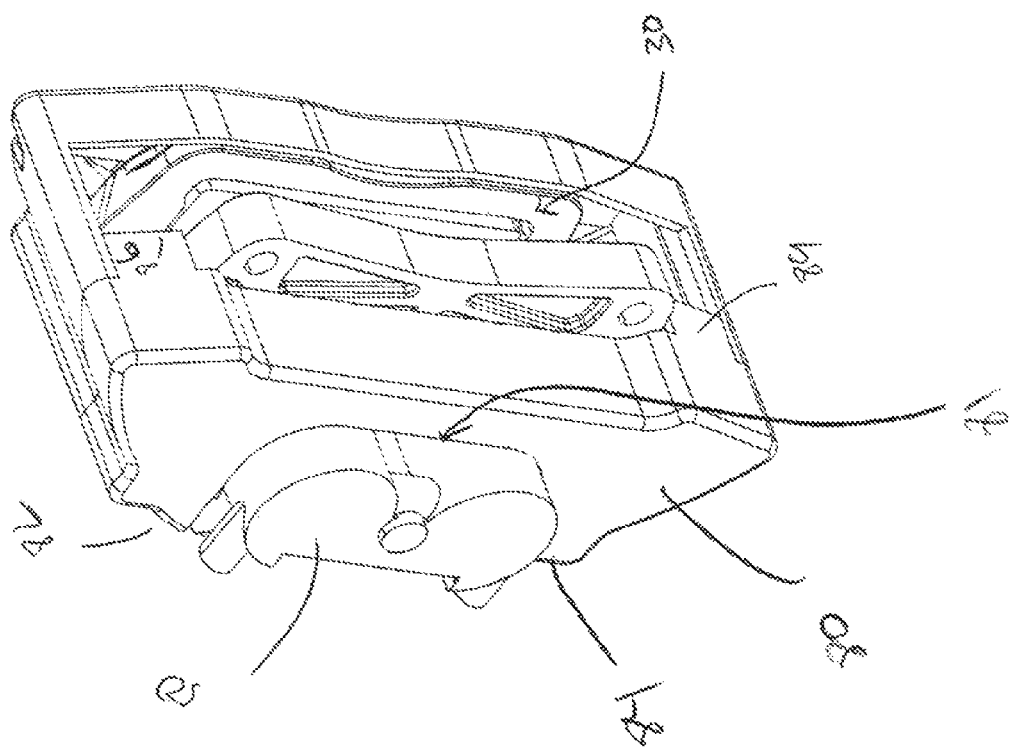
FIG. 4 is a back perspective view of the brake caliper covers on the brake disc caliper with the brake disk removed for clarity.
Figure 5:
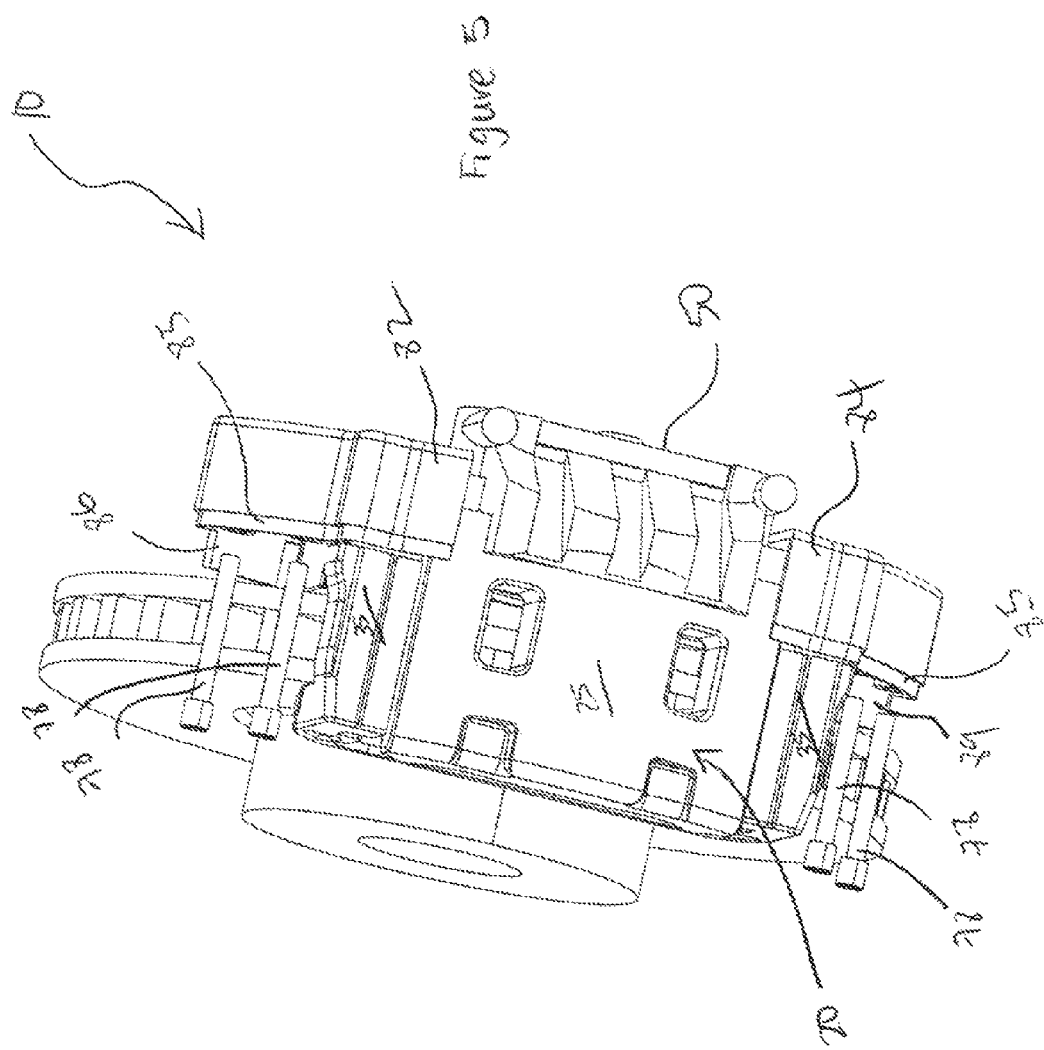
FIG. 5 is a perspective view of the back caliper cover engaging with the brake caliper assembly.

FIG. 3 illustrates an exploded view of the brake caliper cover system and the brake caliper assembly. The back brake caliper cover 80 of the brake caliper cover system 65 has threaded shafts or bosses 88 for receiving the bolts 78. The bosses 88 can be molded into the cover 80. In some embodiments, bosses are not threaded and instead threads are created when the receiving bolts 78 are screwed into the bosses. As illustrated in FIGS. 3 and 4, the back caliper cover 80 does not enclose the piston housing. The back caliper cover 80 has a U-shaped contour 81 which conforms around the piston housing 50. In some embodiments, the back of the cover 80 as well as the cover 70 will be of other shapes to conform to the various shapes of difference styles of caliper design. As illustrated in FIG. 5, the back caliper cover 80 has an upper 82 and lower 84 lip extension which allows the back cover to fit over a portion of the spine region 25 of the caliper housing. In some embodiments, the back cover 80 has upper 86 and lower 89 tabs which protrude into, and engage with, the region above and below the back brake bracket (FIG. 6).

Without wishing to be bound by any particular theory, it is believed that the back caliper cover 80 provides mounting support for the front caliper cover 70. Fastening the front caliper cover to the back caliper cover allows the front caliper cover to be secure against the front side of the caliper housing and the front side of the brake bracket. Upper and lower lips 82, 84, which extend about the top and bottom of the piston housing (FIG. 5) and upper and lower tabs 86, 89, which protrude into the region above and below the back brake bracket, minimizes the movement of the back cover, and accordingly the movement of the front caliper cover, in both a vertical and horizontal direction. The back caliper cover 80 has portions with a recessed perimeter which forms a recessed edge 85 (FIG. 5) to allow portions of the front cover 70 to receivingly engage with the back caliper cover. The covers are attached to a fixed portion of the caliper. The covers, when attached to the fixed portion, allow a moving part of the caliper, such as the hydraulic piston(s), to move along shafts within a spaced defined by the cover. This advantageous because as brake pads wear the position of the caliper moves to account for the fact that the brake pads have friction areas that are reduced compared to their new condition. In this way, the caliper cover not interfere with the braking operation of the caliper.

FIG. 7 illustrates a perspective view of the inner surface of the front brake cover 70 in position over the front brake bracket. As illustrated in FIG. 7, the inner surface of front brake cover is configured to at least cover, and/or to conform to the shape of the front brake bracket and the front brake caliper housing. The front and back brake covers extend above and below the brake bracket such that a portion of the brake disc is also covered by the front and back brake caliper covers. The front brake cover is configured to provide aesthetic appeal to an observer. The inner surface of the front caliper cover can comprise a layer 90 for cushioning the contact between the brake caliper assembly and the caliper cover. The cushioning layer may be a foam layer, or any other suitable material. The cushioning layer can assist in minimizing vibration and/or movement of the brake caliper cover against the brake caliper assembly. The foam layer may be disposed on a portion of the inner surface of the front brake caliper cover as illustrated in FIG. 7, or may be disposed such that the entire inner surface, including the surface enclosing the spine of the brake bracket and the spine of the caliper housing, of the front brake caliper is covered. Alternatively, only the front inner surface of the brake caliper cover may be covered in foam. The foam layer can be made of any suitable foam material which is preferably resistant to wear and tear, and deterioration due to exposure to braking conditions, including heat. The foam layer can be secured to the inner surface of the front brake cover using an adhesive. The inner surface of the back brake cover can also have a cushioning layer over the entire inner surface, or a portion thereof.

From the foregoing, it will be observed that numerous variations and is modifications may be effected without departing from the spirit and scope of the invention. It is to be understood that no limitation with respect to the specific apparatus illustrated herein is intended or should be inferred.

The invention claimed is:

1. A brake caliper cover system for a disc brake system having a brake caliper assembly positioned about a brake disc, the brake disc is at least partially uncovered, the brake caliper assembly having a front side and a back side, the brake caliper cover system comprising:
   a front brake caliper cover having an inner surface, the inner surface configured to cover at least a front surface of the front side of the brake caliper assembly; and
   a back brake caliper cover configured to cover at least a back surface of the back side of the brake caliper assembly, the back brake caliper cover completely seperatable from the front brake caliper cover, the back brake caliper cover joins with the front brake caliper cover along a spine side of the brake caliper assembly, the front brake caliper cover and the back brake caliper cover, when joined, surround the brake caliper assembly and leave the brake disc at least partially uncovered;
   the back brake caliper cover supported at least by contact with one or more non-moving portions of the back surface of the back side of the brake caliper assembly and a connection to the front brake caliper cover when the front brake caliper cover is in contact with a non-moving portion of the front side of the brake caliper assembly;
   at least two fasteners extending between and releaseably connecting the front brake caliper cover and the back brake caliper cover, the at least two fasteners located at opposite ends of the front brake caliper cover and the back brake caliper cover; an operating space is defined between the front and back brake caliper covers allowing a moving portion of the brake caliper assembly to move within the operating space;
   at least a first disc opening and a disc second opening configured to allow the brake disc to rotate through at least a portion of the brake caliper assembly and through the operating space.

2. The brake caliper cover system of claim 1, wherein the inner surface of the front brake caliper cover comprises a cushioning layer.

3. The brake caliper cover system of claim 2, wherein the cushioning layer is a vibration dampening layer.

4. The brake caliper cover system of claim 1, wherein the at least two fasteners are bolts.

5. The brake caliper cover system of claim 1, wherein the front brake caliper cover encloses at least a front side and a spine side of a caliper housing of the caliper assembly, at least a front side and a spine side of a brake bracket of the caliper assembly.

6. The brake caliper cover system of claim 1, wherein the front brake caliper cover is configured to simulate a brake system that is different from the disc brake system on which the brake caliper cover system is installed.

7. The brake caliper cover system of claim 1, wherein the inner surface of the front brake caliper cover is configured to complement a contour of at least a portion of a caliper housing of the caliper assembly and at least a portion of a brake bracket of the caliper assembly.

8. The brake caliper cover system of claim 1, wherein the back brake caliper cover comprises a recessed edge portion, a portion of the front brake caliper cover in contact with the back brake caliper cover fits over the recessed edge portion.

9. The brake caliper cover system of claim 1, wherein the front brake caliper cover extends to enclose at least a portion of the spine side of the caliper assembly.

10. The brake caliper cover system of claim 1, wherein the back brake caliper cover has an edge which defines an opening to allow a portion of the brake caliper assembly to protrude beyond the back brake caliper cover, the edge contours around the protruding portion of the brake caliper assembly.

11. The brake caliper cover system of claim 10, wherein a first end of the edge extends into a first lip extension, and a second end of the edge extends into a second lip extension, said first lip extension fits around a first portion of the spine side of the caliper assembly, and said second lip extension fits around a opposite second portion of the spine side of the caliper assembly.

12. The brake caliper cover system of claim 1, wherein the front brake caliper cover comprises one or more sidewalls forming a front cavity; the back brake caliper cover comprises one or more sidewalls forming a back cavity; the front and back cavities configured to form the operating space to at least partially enclose the brake caliper assembly when the front brake caliper cover and the back brake caliper cover are joined along the spine side of the brake caliper assembly.

13. The brake caliper cover system of claim 1, wherein the at least two fasteners extend transversely across the brake disc from the front brake caliper cover to the back brake caliper cover.

14. The brake caliper cover system of claim 13, wherein each of the front and back brake caliper covers have a first fastener region and an opposite second fastener region, the first and second fastener regions configured to be positioned laterally beyond opposite lateral sides of the brake caliper assembly, said fasteners connecting the front and back brake caliper covers in each of the first and second fastener regions of each of the front and back brake caliper covers.

15. The brake caliper cover system of claim 1, wherein
the at least two fasteners extend transversely across the brake disc from the front brake caliper cover to a connection with the back brake caliper cover;
each of the front and back brake caliper covers have a first fastener region and an opposite second fastener region, the first and second fastener regions configured to be positioned laterally beyond opposite lateral sides of the brake caliper assembly, said fasteners connecting the front and back brake caliper covers in each of the first and second fastener regions of each of the front and back brake caliper covers;
the connection of the front brake caliper cover to the back break caliper cover forms an at least partial enclosure to cover the brake caliper assembly, the partial enclosure completely covers the front side of the brake caliper assembly and at least partially covers the spine side of the brake caliper assembly.

16. A brake caliper cover system for a disc brake system having a brake caliper assembly and a rotatable brake disc, the rotatable brake disc is at least partially uncovered, the brake caliper cover system comprising:
a front cover configured to cover at least a front surface of a front side of the brake caliper assembly; and
a back cover configured to mount on at least a back surface of a back side of the brake caliper assembly, the back cover completely seperatable from the front cover, the back cover joins with the front cover along a spine side of the brake caliper assembly, the front cover and the back cover, when joined, surround the brake caliper assembly and leave the brake disc at least partially uncovered;
a portion of the back cover connects with a portion of the front cover along the spine side of the brake caliper assembly
at least one fastener connecting the front cover and the back cover, the at least one fastener configured to draw, when tightened, the front cover in contact with a non-movable portion of a front side of the brake caliper assembly and the back cover in contact with a non-moveable portion of a back side of the brake caliper assembly;
the back cover supported at least by contact with one or more non-moving portions of the back surface of the back side of the brake caliper assembly and a connection to the front cover when the front cover is in contact with a non-moving portion of the front side of the brake caliper assembly;
an operating space is defined between the front and back covers allowing a moving portion of the brake caliper assembly to move within the operating space;
at least a first disc opening and a disc second opening configured to allow the brake disc to rotate through at least a portion of the brake caliper assembly and through the operating space.

17. The brake caliper cover system of claim 16, wherein an inner surface of the front cover comprises a heat resistant vibration dampening layer.

18. A method of covering a front portion of a brake caliper assembly of a disc brake system, comprising the steps of:
supporting a back caliper cover on the brake caliper assembly by contact between the back caliper cover and a non-moving back portion of the brake caliper assembly, the back caliper cover covering at least a portion of a back surface of a back side of the brake caliper assembly;
covering at least a front surface of a front side of the brake caliper assembly with a front caliper cover and leavinge a brake disc outside of the front and back caliper covers at least partially uncovered; and
supporting the front caliper cover by fastening the front caliper cover to the back caliper cover and by drawing the front caliper cover against a non-moving front portion of the brake caliper assembly.

19. The method of claim 18, wherein the step of supporting the back cover comprises the step of placing a plurality of upper support surfaces of the back cover in surface to surface contact with a spine side of the brake caliper assembly.

* * * * *